United States Patent [19]
Vernon et al.

[11] Patent Number: 5,725,273
[45] Date of Patent: Mar. 10, 1998

[54] VEHICLE ROOF ASSEMBLY WITH REMOVABLE AND STORAGE COCKPIT COVER

[75] Inventors: Dallas L. Vernon, Louisville; Brian C. Coppom, Boulder; John C. Dinsmoor, III, Westminster; Barry Van Everen, Loveland, all of Colo.

[73] Assignee: Bestop, Inc., Broomfield, Colo.

[21] Appl. No.: 546,410

[22] Filed: Oct. 20, 1995

[51] Int. Cl.$^6$ .................. B60J 7/11; B60R 9/04
[52] U.S. Cl. .............. 296/218; 296/37.7; 224/315; 224/326
[58] Field of Search .............. 296/218, 220, 296/37.7; 224/315, 325, 326

[56] References Cited

U.S. PATENT DOCUMENTS

| | | | |
|---|---|---|---|
| 1,854,972 | 10/1932 | Austin . | |
| 2,051,140 | 8/1936 | Grimston | 296/107 |
| 2,190,462 | 2/1940 | Votypka . | |
| 2,967,073 | 1/1961 | Gagliardi | 296/202 |
| 3,635,518 | 1/1972 | Eger | 296/76 |
| 3,823,977 | 7/1974 | Fioravanti | 296/76 |
| 3,993,348 | 11/1976 | Pizzuti . | |
| 4,005,900 | 2/1977 | Rauthmann et al. . | |
| 4,043,590 | 8/1977 | Pizzuti . | |
| 4,272,121 | 6/1981 | Kim | 296/216 |
| 4,346,932 | 8/1982 | Iwata et al. | 296/216 |
| 4,407,541 | 10/1983 | Boots | 296/216 |
| 4,426,112 | 1/1984 | Mori | 296/223 |
| 4,463,983 | 8/1984 | Hellriegel | 296/213 |
| 4,475,767 | 10/1984 | Grimm et al. | 296/221 |
| 4,626,024 | 12/1986 | Swann | 296/216 |
| 4,695,090 | 9/1987 | Draper | 296/216 |
| 4,718,710 | 1/1988 | Iwamura et al. | 296/37.1 |
| 4,801,174 | 1/1989 | Hirshberg et al. | 296/216 |
| 4,950,022 | 8/1990 | Pattee | 296/107 |
| 5,029,937 | 7/1991 | Yamamoto | 296/223 |
| 5,031,949 | 7/1991 | Sorimachi et al. | 296/76 |
| 5,074,614 | 12/1991 | Stefanski | 296/216 |

FOREIGN PATENT DOCUMENTS

| | | | |
|---|---|---|---|
| 56-149213 | 11/1981 | Japan | 296/218 |
| 5-139160 | 6/1993 | Japan . | |

OTHER PUBLICATIONS

Page From L. L. Bean Catalog 1995.

*Primary Examiner*—Dennis H. Pedder
*Attorney, Agent, or Firm*—W. Scott Carson

[57] ABSTRACT

A hardtop roof assembly for a passenger vehicle. The roof assembly includes a hard cover over the passenger cockpit. The cockpit cover is completely removable from the remainder of the roof assembly and vehicle and can be selectively secured over the opening above the passenger cockpit or to a rear storage rack for transport with the vehicle. Because it is completely removable, the cockpit cover can also be stored inside the vehicle or left at home if desired. The cockpit cover uses common securing members to selectively secure it over the opening above the passengers or to the rear storage rack. The cockpit cover and storage rack also have corresponding shapes that assume a neat, strong, and compact mating relationship when secured to each other. Additionally, the side edge portions of the cover and storage rack have vertically extending surfaces that abut and substantially mate with each other to add lateral stability and prevent any side-to-side movement of the cover when it is secured to the storage rack.

24 Claims, 4 Drawing Sheets

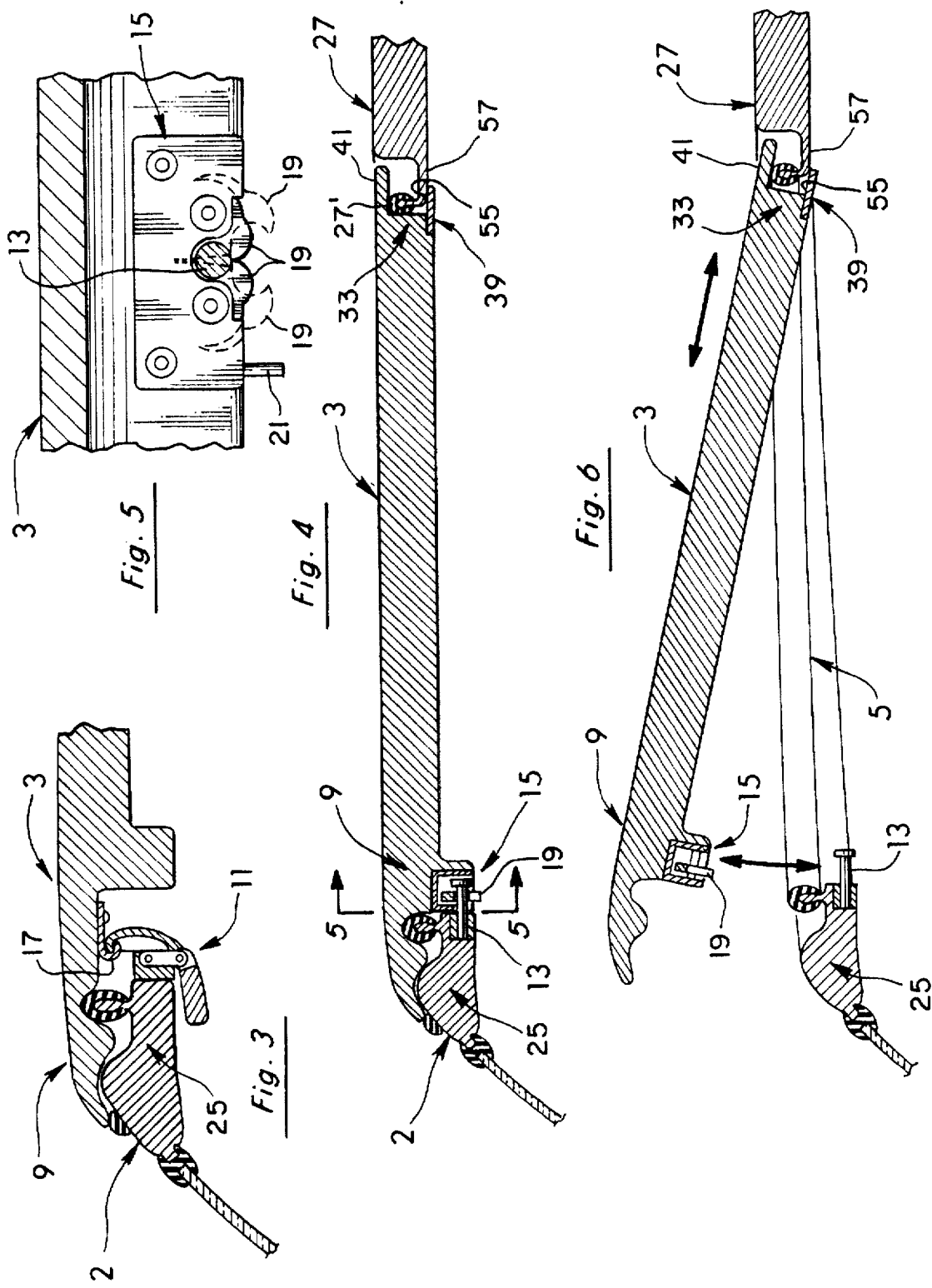

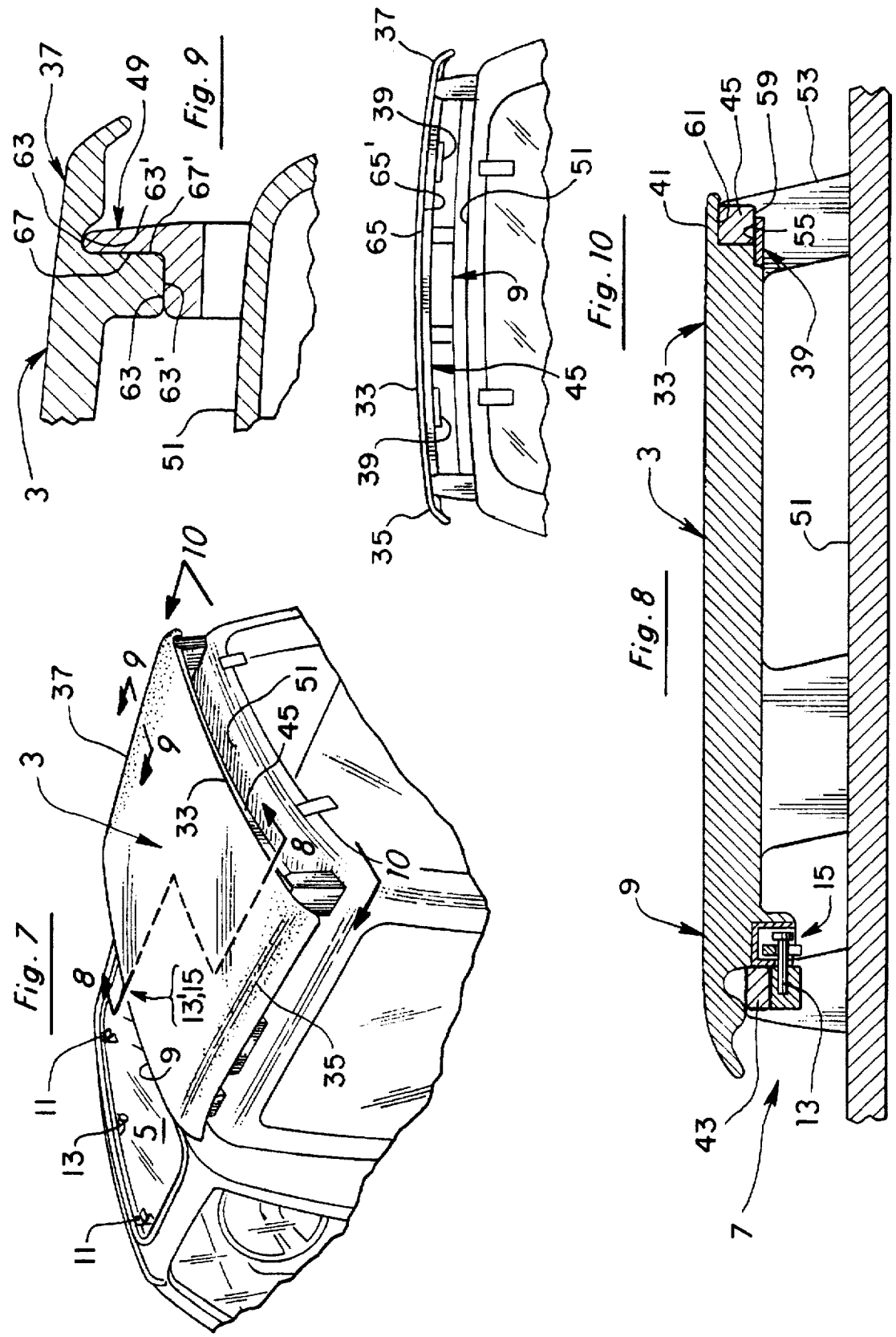

VEHICLE ROOF ASSEMBLY WITH REMOVABLE AND STORAGE COCKPIT COVER

BACKGROUND OF THE INVENTION

1. Field of the Invention

This invention relates to the field of hardtop roof assemblies for passenger vehicles and more particularly to the field of such roof assemblies for sport utility vehicles with removable cockpit covers.

2. Discussion of the Background

Hardtop roof assemblies with cockpit covers that can be opened have become quite popular to provide a partial opening of the vehicle's roof. This not only helps to increase ventilation but also opens up the cockpit or passenger area giving it an open air or convertible feeling. Many such roof assemblies have completely removable cockpit covers or panels but they must be stored inside the vehicle or left at home. If stored inside the vehicle, it can take up valuable space particularly if the vehicle is a sport utility one. In some smaller vehicles, it may not even fit inside. If the cover is left at home, it is then not available if the weather becomes inclement or the driver otherwise wishes to replace it for security or other reasons.

Some roof assemblies address these problems by making the cover slidable or retractable to a rear storage position on the outside of the vehicle. The cover can then be transported with the vehicle. However, these arrangements are often very involved and elaborate having specially designed guides and guide systems for the retractable cover. In some cases including U.S. Pat. No. 4,463,983 and Japanese Patent No. 5-139160, the guides are even integrated into specially designed luggage racks having uniquely configured tracks to receive, guide, and retain these rearwardly sliding covers.

In this light, the present invention was developed. With it, a hardtop roof assembly is provided having a cockpit cover that can be completely removed and either left behind or easily and quickly secured to the vehicle's rear storage rack to be transported with the vehicle.

SUMMARY OF THE INVENTION

This invention relates to a hardtop roof assembly for a passenger vehicle. The roof assembly includes a hard cover over the passenger cockpit. The cockpit cover is completely removable from the remainder of the roof assembly and vehicle and can be selectively secured over the opening above the passenger cockpit or to a rear storage rack for transport with the vehicle. Because it is completely removable, the cockpit cover can also be stored inside the vehicle or left at home if desired.

In the preferred embodiment, the cockpit cover uses common securing members to selectively secure it over the opening above the passengers or to the rear storage rack. This greatly simplifies the cost, manufacture, and operation of the roof assembly. The cockpit cover and storage rack also have corresponding shapes that assume a neat, strong, and compact mating relationship when secured to each other. Additionally, the side edge portions of the cover and storage rack have vertically extending surfaces that abut and substantially mate with each other. These surfaces serve to add lateral stability to prevent any side-to-side movement of the cover when it is secured to the storage rack.

BRIEF DESCRIPTION OF THE DRAWINGS

FIG. 3 is a view taken along line 3—3 of FIG. 1 illustrating one of the side toggles securing the front of the cockpit cover in place.

FIG. 4 is a view taken along line 4—4 of FIG. 1 showing the central pin-latch arrangement securing the front of the cockpit in place and showing one of the rear brackets securing the rear of the cockpit cover in place.

FIG. 5 is a view taken along line 5—5 of FIG. 4 further illustrating the pin-latch arrangement.

FIG. 6 is a view similar to FIG. 4 showing how the cockpit cover can be removed.

FIG. 7 is a perspective view of the cockpit cover secured over the rear storage rack.

FIG. 8 is a view taken along line 8—8 of FIG. 7 showing how the cover is secured to the storage rack in a manner substantially identical to FIG. 4.

FIG. 9 is a view taken along line 9—9 of FIG. 7 illustrating the manner in which the side edge portions of the cover abut and mate with the side rack members for lateral stability.

FIG. 10 is a rear elevational view taken along line 10—10 of FIG. 7.

DETAILED DESCRIPTION OF THE PREFERRED EMBODIMENTS

Figure 1:
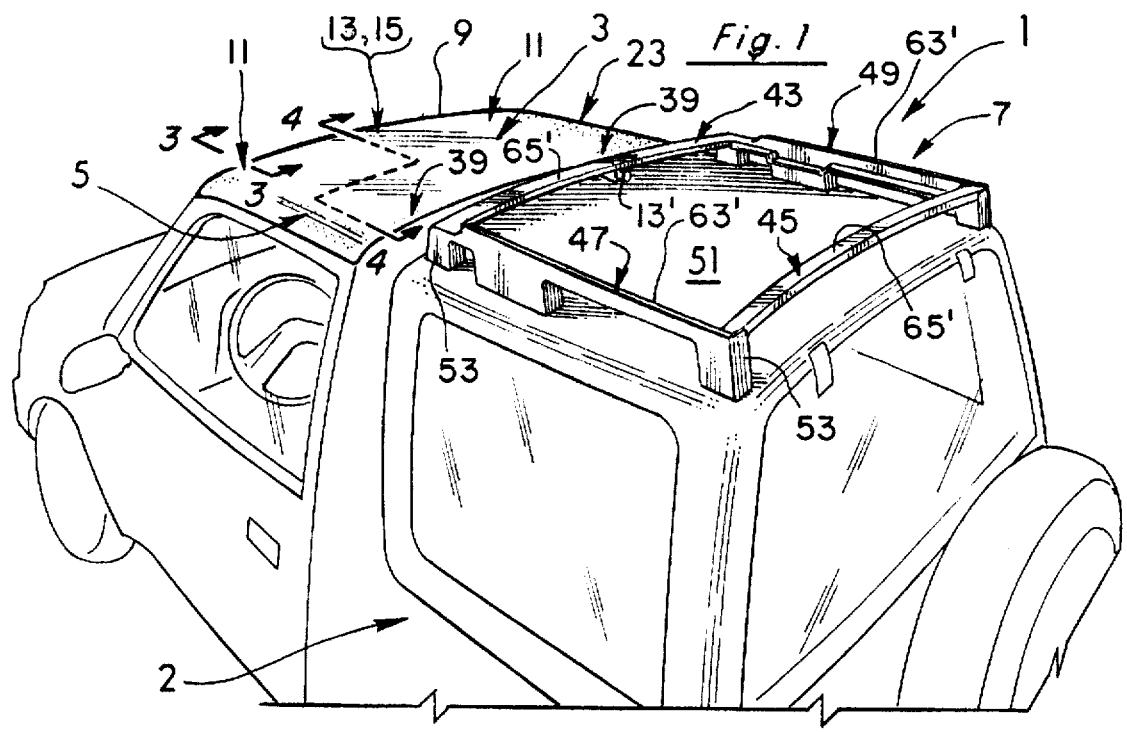
FIG. 1 illustrates the hardtop roof assembly of the present invention with the removable cover secured over the passenger cockpit.
Figure 2:
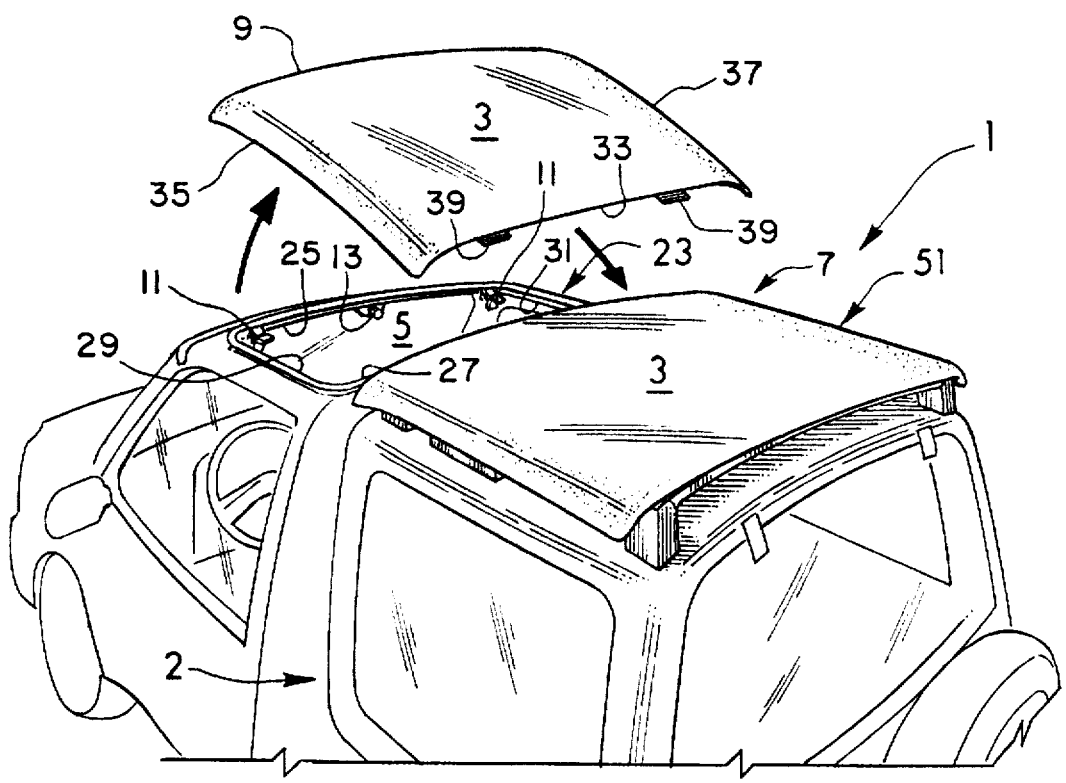
FIG. 2 illustrates the manner in which the cockpit cover can be completely removed from the remainder of the roof assembly and the vehicle and selectively secured to the rear storage rack for transport with the vehicle.

As best seen in FIGS. 1 and 2, the hardtop roof assembly 1 of the present invention includes a removable cockpit cover 3. The cover 3 as shown is completely removable and can be selectively secured over the cockpit opening 5 (FIG. 1) or over the rear storage rack 7 (FIG. 2). Additionally, the completely removable cover 3 can be stored inside the vehicle or left at home if desired.

Referring again to FIG. 1, the removable cockpit cover 3 is preferably secured over the opening 5 adjacent the front edge portion 9 of the cover 3 by two side toggles at 11 and a central pin-latch arrangement at 13, 15. Each of the side toggles 11 as shown in FIG. 3 can simply be an overcenter toggle of any known design attachable between the body of the passenger vehicle 2 and a hook or other member 17 depending from the underside of the cockpit cover 3. Similarly, the central pin-latch arrangement 13, 15 (see FIGS. 4 and 5) can be of any common design such as used, for example, on vehicle door latches. Such arrangements as illustrated in FIGS. 4 and 5 consist essentially of a pin 13 and latch 15 wherein the latch 15 has two pivotally mounted catch members 19. The members 19 lock on the pin 13 as the latch 15 is lowered onto the pin 13 (shown in solid lines in FIG. 5). The members 19 (as shown in dotted lines in FIG. 5) can then be opened or unlocked from the pin 13 by simply manually moving the control lever 21. As stated above, the side toggles 11 and pin-latch arrangement 13, 15 can be of any common design but are preferably manually operated ones.

The cockpit opening 5 as seen in FIG. 2 is in the forward half or front roof section 23 of the roof assembly 1 above the passenger cockpit. The opening 5 is defined by front and rear edge portions 25 and 27 and side edge portions 29 and 31 that extend therebetween forming a generally rectangularly shaped opening. The cockpit cover 3 has a substantially similar and corresponding shape defined by its front, rear, and side edge portions 9, 33, 35, and 37. As discussed above, the front edge portion 9 of the cockpit cover 3 is removably securable to the front edge portion 25 of the opening 5 by side toggles 11 and the central pin-latch arrangement 13, 15. In the rear, the cockpit cover 3 as best seen in FIGS. 1, 2, and 4 preferably has two brackets 39 extending rearwardly from the rear edge portion 33 of the cover 3. Each bracket 39 along with the rear perimeter lip 41 of the rear edge portion 33 of cover 3 (see FIG. 4) forms a U-shape. This U-shape as shown receives the sealing end 27' of the rear edge portion 27 of the opening 5 to hold and seal the cover 3 in place.

The rear storage rack 7 as illustrated in FIG. 1 includes front and rear members 43 and 45 and side members 47 and 49 extending therebetween. The rack members 43, 45, 47, and 49 as shown are mounted over and spaced from the rear roof section 51 of the roof assembly 1 by leg portions 53. The front rack member 43 extends laterally across the roof section 51 and has a rearwardly extending pin 13' (see FIG. 1). This pin 13' is preferably identical to the pin 13 at the front edge portion 25 of opening 5 and as explained below, preferably operates with the latch 15 mounted on the underside of cover 3 in exactly the same manner.

More specifically, to remove the cockpit cover 3 to uncover the opening 5, the side toggles 11 and central pin-latch arrangement 13, 15 of FIGS. 3–5 are first unlocked. The cover 3 is then manually moved slightly forwardly and tilted upwardly (see FIG. 6) as the cover 3 is removed. Once completely removed, the cover 3 can be manually moved rearwardly over the storage rack 7 and then secured in place to the storage rack 7 by simply reversing the removal steps including that of FIG. 6. In securing the cockpit cover 3 to the storage rack 7, the same central latch 15 and rear brackets 39 are used in essentially the same manner they were used to secure the cover 3 over the opening 5. In other words, the means for removably securing the cockpit cover 3 over the opening 5 and the means for selectively securing the cover 3 to the storage rack 7 share or use the same or common securing members 15 and 39. This greatly reduces the number and cost of the parts involved and significantly reduces the manufacturing time and expense. It also makes both securing operations simple and easy to learn and to do. In comparing FIGS. 4 and 8, it can be seen that the pin-latch arrangements 13, 15 (FIG. 4) and 13', 15 (FIG. 8) and their operation are identical. In this manner, these arrangements can be used to selectively secure the front edge portion 9 of the cover 3 to the front edge portion 25 of the opening 5 (FIG. 4) or to the front member 43 of the storage rack 7 (FIG. 8). Similarly, each rear bracket 39 has a flat surface 55 which selectively abuts the inner surface 57 of the rear edge portion 27 of the opening 5 (FIGS. 4 and 6) or the lower surface 59 of the rear rack member 45 (FIG. 8). The rear peripheral or perimeter lip 41 of the cover 3 then respectively abuts the sealing end 27' of the rear edge portion 27 (FIG. 4) or the upper surface 61 of the rear rack member 45 (FIG. 8).

As discussed above, the shapes of the cockpit cover 3, opening 5, and storage rack 7 are substantially the same (e.g., rectangular). Additionally, when the cover 3 is secured over the storage rack 7 for transport with the vehicle 2, it is done so with the corresponding shapes of the cover 3 and rack 7 substantially aligned with one another. Further, the cover 3 and members 43, 45, 47, and 49 of the storage rack 7 preferably have mating and abutting horizontally extending surfaces such as 63 and 63' in FIG. 9 and 65 and 65' in FIG. 10. At least some of these surfaces preferably extend down together to extend substantially continuously about the underside of the cover 3 (see FIG. 11) and storage rack 7 (see FIG. 1). In this manner, the cover 3 (which is made of hard plastic or other relatively rigid material) and the storage rack 7 assume a neat, strong, and compact mating relationship when secured to each other. The side members 47 and 49 of the storage rack 7 and the side edge portions 35 and 37 of the cover 3 also preferably have vertically extending surfaces 67 and 67' that mate and abut one another (see FIG. 9). This serves to add lateral stability to prevent any side-to-side movement of the cover 3 when the cover 3 is secured to the storage rack 7. Additionally, the side edge portions 35 and 37 of the cover 3 preferably extend slightly outwardly of and over the side rack members as best seen in FIGS. 9 and 10. Similarly, the front and rear edge portions 9 and 33 of the cover 3 preferably extend over the front and rear rack members 43 and 45.

Figure 11:
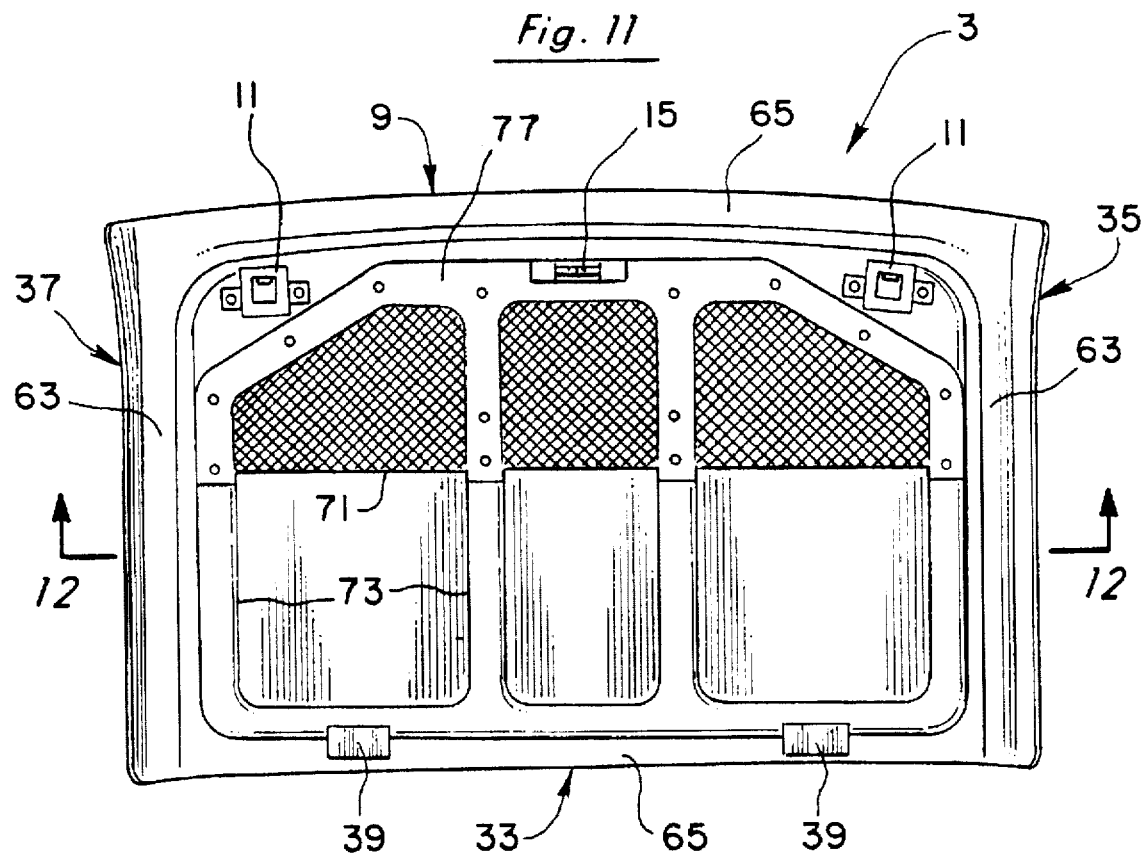
FIG. 11 is a view of the underside of the cockpit cover with cargo netting added across the longitudinal ribs of the cover to form overhead pockets.
Figure 12:
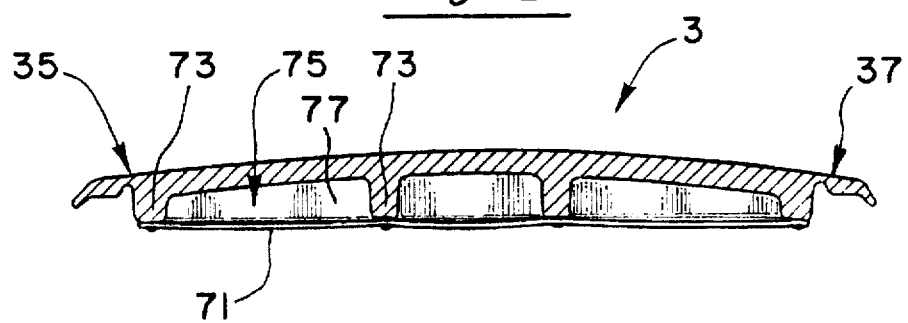
FIG. 12 is a view of the cockpit cover taken along line 12—12 of FIG. 11 but rotated 180 degrees to the position it would normally assume when secured in place over the cockpit opening.

In the embodiment of FIGS. 11 and 12, flexible cargo netting 71 has been secured to extend across the underside of the cover 3 between the longitudinal ribs 73 to form overhead storage pockets 75 (see FIG. 12). FIG. 12 in this regard is a view of the cover 3 taken along line 12—12 of FIG. 11 but rotated 180 degrees to the position the cover 3 would normally assume when secured in place over the cockpit opening 5 in FIG. 1. The overhead pockets 75 as shown are formed or attached adjacent the front edge portion 9 of the cover 3 with the cargo netting 71 preferably attached to both the longitudinal ribs 73 and the front rib 77 of the cover 3. Maps, glasses, garage door openers, and other items can then be conveniently stored if desired in these overhead pockets 75.

While several embodiments of the present invention have been shown and described in detail, it is to be understood that various changes and modifications could be made without departing from the scope of the invention.

We claim:

1. A hardtop roof assembly for a passenger vehicle having a passenger cockpit, said roof assembly having front and rear roof sections, said roof assembly further having an opening in the front roof section above said passenger cockpit, a completely removable and hard cockpit cover, means for removably securing said cockpit cover to said front roof section of said roof assembly over said opening, a storage rack, means for mounting said storage rack over said rear roof section of said roof assembly, and means for selectively securing said cockpit cover to said storage rack wherein said cockpit cover can be completely removed from the remainder of said roof assembly including said front and rear roof sections and said storage rack and then selectively secured to said storage rack for transport with said passenger vehicle if desired.

2. The hardtop roof assembly of claim 1 wherein said means for removably securing said cockpit cover over said opening and said means for selectively securing said cockpit cover to said storage rack include at least one common securing member.

3. The hardtop roof assembly of claim 2 wherein said common securing member is mounted on said cockpit cover.

4. The hardtop roof assembly of claim 3 wherein said cockpit cover has front and rear edge portions and said common securing member is mounted on said cockpit cover adjacent the rear edge portion thereof.

5. The hardtop roof assembly of claim 4 wherein said opening in the front roof section of said roof assembly is defined by front and rear edge portions and side edge portions extending therebetween and wherein said cockpit cover additionally includes side edge portions extending between the front and rear edge portions thereof, said cockpit cover about the front, rear, and side edge portions thereof having a shape substantially corresponding to the shape of the opening as defined by said front, rear, and side edge portions in the front roof section of said roof assembly, said rear edge portion of said opening having outer and inner surfaces wherein said common securing member substantially abuts said inner surface when said cockpit cover is secured over said opening.

6. The hardtop roof assembly of claim 5 wherein said storage rack has a rear member spaced from and above said rear roof section of said roof assembly and mounted to extend substantially across said rear roof section, said rear member having upper and lower surfaces wherein said common securing member substantially abuts said lower surface of said rear member when said cockpit cover is secured to said storage rack.

7. The hardtop roof assembly of claim 6 wherein said common securing member is a bracket extending rearwardly from said cockpit cover.

8. The hardtop roof assembly of claim 7 wherein said bracket has a substantially flat surface wherein said flat surface substantially abuts the inner surface of the rear edge portion of said opening when said cockpit cover is secured over said opening and substantially abuts the lower surface of the rear member of said storage rack when said cockpit cover is secured to said storage rack.

9. The hardtop roof assembly of claim 4 wherein said means for removably securing said cockpit cover over said opening and said means for selectively securing said cockpit cover to said storage rack include at least a second common securing member mounted on said cockpit cover adjacent the front edge portion thereof.

10. The hardtop roof assembly of claim 9 wherein said storage rack has front and rear members mounted to extend substantially across said rear roof section, said one common securing member substantially abutting said rear member and said second common securing member substantially abutting said front member when said cockpit cover is secured to said storage rack.

11. The hardtop roof assembly of claim 1 wherein said cockpit cover has front and rear edge portions and side edge portions extending therebetween and said storage rack has front and rear members extending across said rear roof section and side members extending between said front and rear members wherein said storage rack about said front, rear, and side members has a shape substantially corresponding to the shape of said cockpit cover about the front, rear, and side edge portions thereof and wherein said securing means secures said cockpit cover to said storage rack with said substantially corresponding shapes thereof substantially aligned with each other.

12. The hardtop roof assembly of claim 11 wherein said securing means secures said cockpit cover over said storage rack.

13. The hardtop roof assembly of claim 12 wherein said side edge portions of said cockpit cover and said side members of said storage rack have substantially abutting, vertically extending surfaces for preventing lateral movement of said side edge portions relative to said side members of said storage rack.

14. The hardtop roof assembly of claim 13 wherein said abutting surfaces are substantially mating surfaces.

15. The hardtop roof assembly of claim 13 wherein each of said side edge portions of said cockpit cover extends outwardly of and over the respective member of said storage rack when said cockpit cover is secured to said storage rack.

16. The hardtop roof assembly of claim 11 wherein said front, rear, and side edge portions of said cockpit cover have substantially horizontally extending surfaces and said front, rear, and side members of said storage rack have substantially horizontally extending surfaces and said securing means secures said cockpit cover over said storage rack with the horizontally extending surfaces of said cockpit cover and said members of said storage rack substantially abutting.

17. The hardtop roof assembly of claim 16 wherein said horizontally extending surface of said cockpit cover and said members of said storage rack respectively extend substantially continuously about said cockpit cover and said storage rack.

18. The hardtop roof assembly of claim 1 wherein said securing means selectively secures said completely removably cockpit cover over said storage rack.

19. The hardtop roof assembly of claim 18 wherein said cockpit cover and said storage rack have substantially corresponding and mating shapes.

20. The hardtop roof assembly of claim 1 wherein said storage rack has front and rear members and side members extending therebetween and said securing means selectively secures said completely removable cockpit cover over said front, rear, and side members of said storage rack.

21. The hardtop roof assembly of claim 1 wherein said cockpit cover has an underside and includes at least one storage pocket attached thereto adjacent the front edge portion of said removable cockpit cover.

22. The hardtop roof assembly of claim 1 wherein said cockpit cover has an underside with longitudinal ribs extending therealong and means extending between said ribs to form at least one storage pocket therewith.

23. The hardtop roof assembly of claim 22 wherein said means extending between said ribs is flexible cargo netting.

24. The hardtop roof assembly of claim 23 wherein said storage pocket is positioned adjacent the front edge portion of the cockpit cover.

* * * * *